US009285266B2

(12) United States Patent
Nakamura et al.

(10) Patent No.: US 9,285,266 B2
(45) Date of Patent: Mar. 15, 2016

(54) OBJECT DETECTOR INCLUDING A LIGHT SOURCE WITH LIGHT EMITTING REGION OF A FIRST SIZE IN A FIRST DIRECTION AND A SECOND SIZE IN A SECOND DIRECTION

(71) Applicants: Tadashi Nakamura, Tokyo (JP); Shigeaki Imai, Kanagawa (JP)

(72) Inventors: Tadashi Nakamura, Tokyo (JP); Shigeaki Imai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 61 days.

(21) Appl. No.: 14/151,989

(22) Filed: Jan. 10, 2014

(65) Prior Publication Data
US 2014/0209793 A1 Jul. 31, 2014

(30) Foreign Application Priority Data
Jan. 30, 2013 (JP) ................. 2013-015941

(51) Int. Cl.
*G01J 1/04* (2006.01)
*G01J 1/42* (2006.01)
*G01S 7/481* (2006.01)
*G01S 17/93* (2006.01)

(52) U.S. Cl.
CPC ............... *G01J 1/0407* (2013.01); *G01J 1/42* (2013.01); *G01S 7/481* (2013.01); *G01S 7/4815* (2013.01); *G01S 17/936* (2013.01)

(58) Field of Classification Search
CPC .......... G01J 1/0407; G01J 1/42; G02B 26/08; G02B 26/10; G02B 26/12; G02B 26/123; G02B 26/127; G01S 7/481
USPC ........ 250/216, 221, 224, 338.1, 338.2, 338.3, 250/234–236; 359/196.1, 204, 298–320, 359/830, 884; 340/555–557; 347/243, 244; 356/4.01, 73
See application file for complete search history.

(56) References Cited

U.S. PATENT DOCUMENTS

| 5,864,391 A | 1/1999 | Hosokawa et al. |
| 2005/0094233 A1 | 5/2005 | Tomioka |

(Continued)

FOREIGN PATENT DOCUMENTS

| EP | 1 515 157 A1 | 3/2005 |
| JP | 11-304469 | 11/1999 |
| JP | 3446466 | 9/2003 |

OTHER PUBLICATIONS

Machine translation of EP 1515157 A1 Description.*
Machine translation of EP 1515157 A1 Claims.*
Extended European Search Report issued Jun. 2, 2014 in Patent Application No. 14151325.9.
U.S. Appl. No. 13/930,030, filed Jun. 28, 2013.

(Continued)

*Primary Examiner* — Kevin Pyo
(74) *Attorney, Agent, or Firm* — Oblon, McClelland, Maier & Neustadt, L.L.P.

(57) ABSTRACT

An object detector includes a light source; an optical system that converts a light beam emitted from the light source into a predetermined state; a deflector that deflects and scans the light beam passing through the optical system, and that irradiates the light beam onto an object; and a photo detector that detects reflected light or scattered light. A first size of a light emitting region of the light source is different from a second size of the light emitting region, wherein the first size is a first width of the light emitting region in a first direction, and the second size is a second width of the light emitting region in a second direction. One of the first direction and the second direction corresponding to a smaller one of the first size and the second size coincides with a direction in which angular resolution is higher.

8 Claims, 9 Drawing Sheets

(56) References Cited

U.S. PATENT DOCUMENTS

2006/0285187 A1* 12/2006 Ichii et al. .................. 359/205
2011/0304684 A1* 12/2011 Numata et al. ............... 347/225

OTHER PUBLICATIONS

U.S. Appl. No. 13/955,230, filed Jul. 31, 2013.
U.S. Appl. No. 13/956,748, filed Aug. 1, 2013.

* cited by examiner

OBJECT DETECTOR INCLUDING A LIGHT SOURCE WITH LIGHT EMITTING REGION OF A FIRST SIZE IN A FIRST DIRECTION AND A SECOND SIZE IN A SECOND DIRECTION

BACKGROUND OF THE INVENTION

1. Field of the Invention

The present invention relates to an object detector.

2. Description of the Related Art

A laser radar has been known as an in-vehicle device that detects the presence or absence of an object in front of a moving vehicle, and that detects a distance to the object.

A laser radar is a device that detects the presence or absence of an object in a desired range, and that detects a distance to the object. In order to detect an object or a distance to the object, the laser radar irradiates a laser beam emitted from a light source (a laser diode) onto the object, while scanning the laser beam by a rotating mirror, and the laser radar detects reflected light or scattered light from the object with a photo detector. As a photo detector, an avalanche photodiode is utilized, for example.

In a detection range, there exists a minimum detectable angular range (which is referred to as "angular resolution," hereinafter). When, in the detection range, a main scanning direction is defined to be a direction in which a laser beam is to be scanned, and a sub-scanning direction is defined to be a direction which is perpendicular to a plane formed by scanning the laser beam, the angular resolution in the main scanning direction is different from the angular resolution in the sub-scanning direction.

Though the angular resolution depends on various conditions, such as performance of the photo detector, or reflectivity of an object, in general, the angular resolution is defined to be a range of an object which can be detected by single pulse scanning. Here, "the range of the object which can be detected by the single pulse scanning" means a region in a detection range in which an image of a light source overlaps with an image of a photo detector.

For example, even if a particular region is within a region of an image of a light source, namely, the particular region is in a range which is irradiated by the light source, if the particular region is out of a region detectable by the photo detector, reflected light from the particular region is not guided to the photo detector. Thus, the reflected light from the particular region is not detected. Conversely, if a particular region is within a region detectable by a photo detector, but the particular region is out of a region of an image of a light source, the particular region is not irradiated by the light source. Thus, neither reflected light nor scattered light is generated in this case.

SUMMARY OF THE INVENTION

Patent Document 1 (Japanese Unexamined Patent Publication No. H11-304469) discloses an example of an object detector. In Patent Document 1, a light beam from a semiconductor laser as a light source is converted into parallel light by a transmitter lens as an optical system. Namely, a distance from the semiconductor laser to a principal point of the transmitter lens is set to be equal to a focal length of the transmitter lens, so that a conjugate image of its object point is formed at infinity.

The light beam which is converted into the parallel light by the transmitter lens is subsequently scanned by a rotating mirror. In such a detector which utilizes parallel light, necessary and sufficient detection can be made in a range which is separated from the rotating mirror by a constant distance. However, in a range separated from the rotating mirror beyond the constant distance, a detection area may be missed, or some detection areas may be overlapped with each other.

In addition, in the example of Patent Document 1, a size of a light emitting region in the semiconductor laser is not considered. Here, a width of the light emitting region in a predetermined direction is referred to as a "size of the light emitting region." When the size of the light emitting region becomes large to some extent, even if the above-described arrangement is applied, the light beam after passing through the transmitter lens may not be converted into parallel light. A problem is that the loss of light quantity becomes large when the size of the light emitting region of the light source is not considered.

An embodiment of the present invention is developed in view of the above-described problem. There is a need for an object detector which can reduce the loss of light quantity.

According to an aspect of the present invention, there is provided an object detector including a light source; an optical system configured to convert a light beam emitted from the light source into a predetermined state; a deflector configured to deflect and scan the light beam passing through the optical system, and configured to irradiate the light beam onto an object; and a photo detector configured to detect, from the object, reflected light or scattered light of the light beam irradiated onto the object. A first size of a light emitting region of the light source is different from a second size of the light emitting region, wherein the first size is a first width of the light emitting region in a first direction, and the second size is a second width of the light emitting region in a second direction. One of the first direction and the second direction corresponding to a smaller one of the first size and the second size coincides with a high angular resolution direction in which angular resolution is high, wherein the angular resolution is a minimum detectable angular range.

According to a disclosed technique, an object detector can be provided which can reduce loss of light quantity.

Other objects, features and advantages of the present invention will become more apparent from the following detailed description when read in conjunction with the accompanying drawings.

DETAILED DESCRIPTION OF THE PREFERRED EMBODIMENTS

Figure 1A:
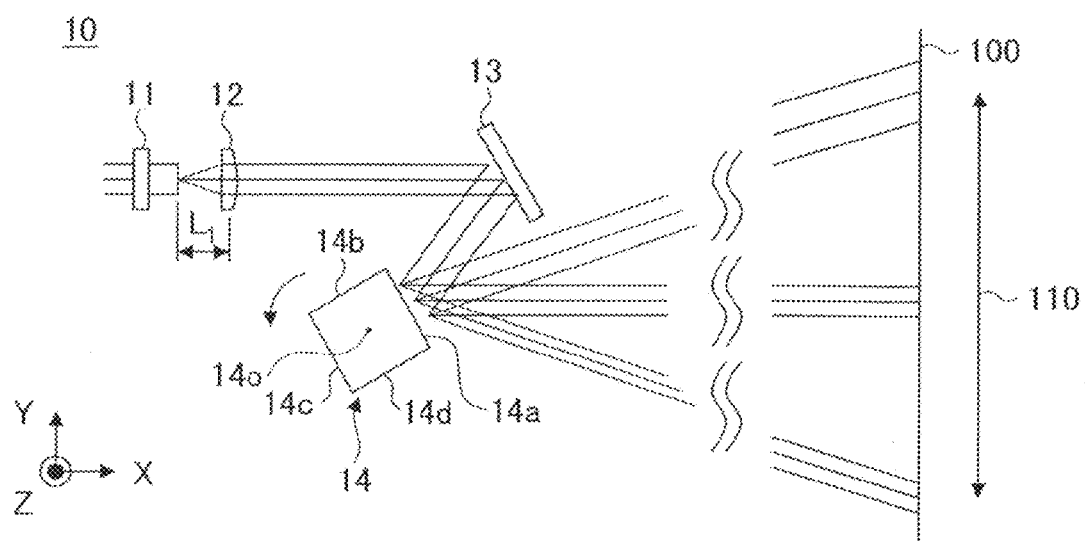
FIGS. 1A and 1B are schematic diagrams exemplifying a projection optical system of an object detector according to an embodiment.

Hereinafter, a configuration for implementing the present invention is explained by referring to the accompanying drawings. In the drawings, an overlapped explanation may be omitted by attaching the same reference symbols to the same portions of the configuration.

Figure 1B:
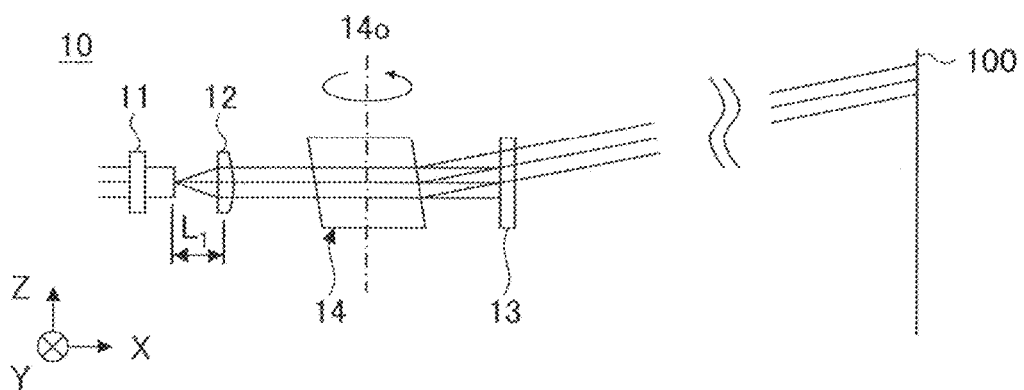
Figure 2A:
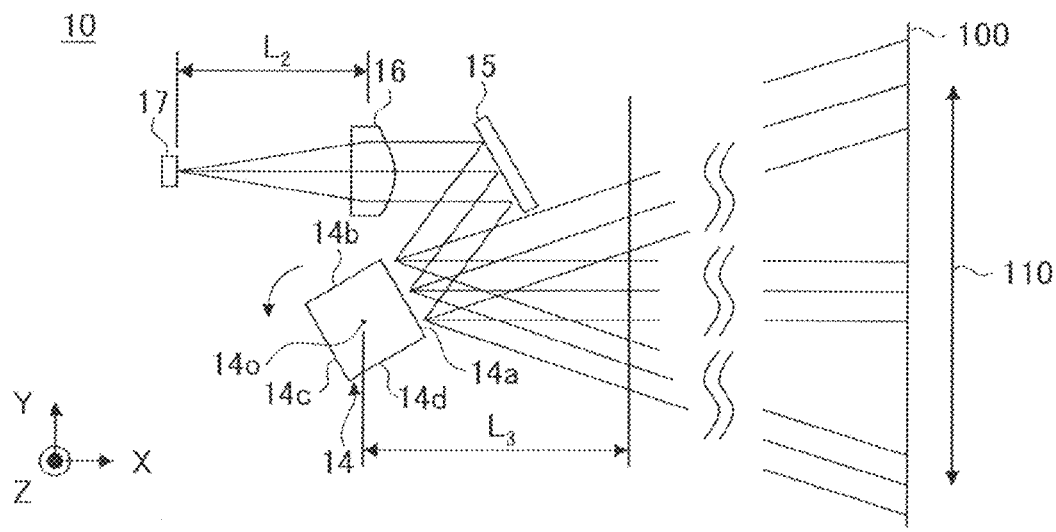
FIGS. 2A and 2B are schematic diagrams exemplifying a receiving optical system of the object detector according to the embodiment.
Figure 2B:
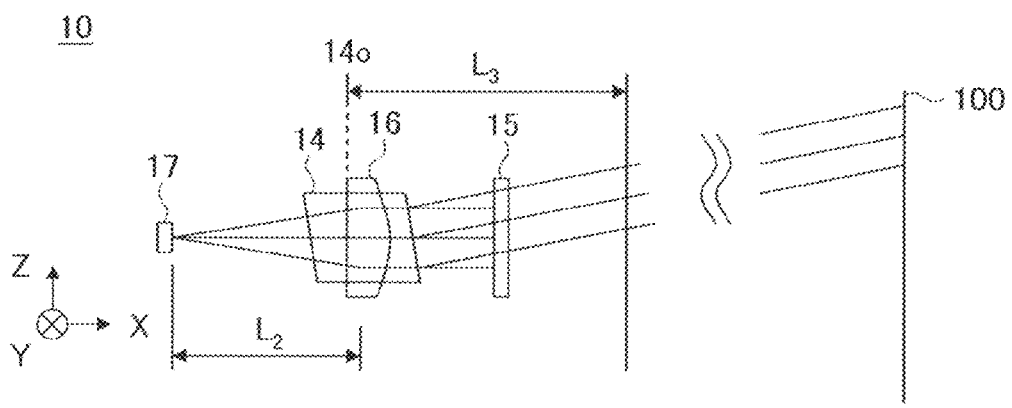

FIGS. 1A and 1B are schematic diagrams exemplifying a projection optical system of an object detector according to an embodiment. FIG. 1A shows a cross-section in a direction parallel to an XY plane. FIG. 1B shows a cross-section in a direction parallel to an XZ plane. FIGS. 2A and 2B are schematic diagrams exemplifying a receiving optical system of the object detector according to the embodiment. FIG. 2A shows a cross-section in a direction parallel to the XY plane. FIG. 2B shows a cross-section in a direction parallel to the XZ plane.

Referring to FIGS. 1A, 1B, 2A, and 2B, the object detector 10 includes, at least, a light source 11; a coupling lens 12; a reflection mirror 13; a rotating mirror 14; a reflection mirror 15; an imaging lens 16; and a photo detector 17. The object detector 10 is a device for detecting the presence or absence of an object, for measuring a distance to the object, and the like. For example, the object detector 10 can be used for an in-vehicle laser radar. In FIGS. 1A, 1B, 2A, and 2B, the reference numeral 100 denotes an image surface of an object to be detected, and the reference numeral 110 denotes a detection range.

In FIGS. 1A, 1B, 2A, and 2B, the coordinate axes define a three-dimensional orthogonal coordinate system such that an X-axis is defined to be an axis from the rotating mirror 14 to a center of the detection range 110, a Y-axis is defined to be a direction which is scanned by the rotating mirror 14; and a Z-axis is defined to be a direction of a rotational axis of the rotating mirror 14 (which are the same for subsequent figures). The Y-axis direction, in which the rotating mirror 14 as a deflector deflects a light beam and scans the light beam, may be referred to as a "main scanning direction," and the Z-axis direction perpendicular to the main scanning direction may be referred to as a "sub-scanning direction." Additionally or alternatively, one of the main scanning direction and the sub-scanning direction may be referred to as a "first direction," and the other one may be referred to as a "second direction."

As the light source 11, a solid light source may be utilized, such as a semiconductor laser or a light-emitting diode. In the embodiment, a semiconductor laser is utilized as the light source 11. Hereinafter, an example is explained in which the semiconductor laser is caused to perform pulse light emission.

The coupling lens 12 is disposed downstream of the light source 11. Here, the coupling lens 12 may be formed of a plurality of optical elements. The coupling lens 12 is an optical system that converts a light beam emitted from the light source 11 (diverging light) into a predetermined state. Here, "converts the light beam into the predetermined state" may mean to condense the light beam, or to convert the light beam into parallel light, for example. In the embodiment, a focal length of the coupling lens 12 in the main scanning direction is equal to a focal length of the coupling lens 12 in the sub-scanning direction.

In the embodiment, the light source 11 and the coupling lens 12 are disposed, so that a distance $L_1$ from a light emitting point of the light source 11 to a first principal point of the coupling lens 12 in the main scanning direction is less than the focal length of the coupling lens 12 in the main scanning direction. Namely, in the main scanning direction, the coupling lens 12 is disposed at a position such that the first principal point is separated from the light emitting point of the light source by a distance which is less than the focal length of the coupling lens 12. Here, the first principal point of the coupling lens 12 is defined to be a point at which a principal plane of the coupling lens 12 and an optical axis of the coupling lens meet at right angles.

Additionally, the light source 11 and the coupling lens 12 are disposed, so that the distance $L_1$ from the light emitting point of the light source 11 to the first principal point of the coupling lens 12 is less than the focal length of the coupling lens 12 in the sub-scanning direction. Namely, in the sub-scanning direction, the coupling lens 12 is disposed at a position such that the first principal point is separated from the light emitting point of the light source 11 by a distance which is less than the focal length of the coupling lens 12.

After passing through the coupling lens 12, the light enters the reflection mirror 13, and an optical path of the light is converted. Then, the light enters the rotating mirror 14. The rotating mirror 14 includes at least two reflectors (reflection surfaces). The reflectors are arranged in the rotating mirror 14, while the reflectors are tilted with respect to a rotational axis 14o of the rotating mirror 14 by corresponding angles, which are different from each other.

In the embodiment, the rotating mirror 14 includes four reflectors 14a, 14b, 14c, and 14d. Tilt angles of the reflectors 14a, 14b, 14c, and 14d with respect to the rotational axis 14o are adjusted, so that the tilt angles are different from each other. By such a configuration, an angle of a traveling direction of the light reflected from the rotating mirror 14 can be switched with respect to the XY plane, and a layer to be detected can be shifted in the Z-axis direction, depending on which one of the reflectors 14a, 14b, 14c, and 14d is utilized. Namely, for each of the reflectors 14a, 14b, 14c, and 14d, a corresponding region in the Z-axis direction can be scanned. Here, the regions scanned by using the reflectors 14a, 14b, 14c, and 14d are different from each other. In the embodiment, four layers can be detected.

The light which enters the rotating mirror 14 is deflected and scanned by the rotating reflectors 14a, 14b, 14c, and 14d, thereby irradiating the detection range 110 of the image surface 100. The reflected light or the scattered light from the detection range 110 of the image surface 100 enters the rotating mirror 14 again, and the light is sequentially reflected by the reflectors 14a, 14b, 14c, and 14d. Subsequently, the light is reflected by the reflection mirror 15, and thereby the light enters the imaging lens 16.

As described above, the rotating mirror 14 has a function to irradiate a light beam onto an object by deflecting and scanning the light beam, which passes through the coupling lens 12. The rotating mirror 14 is an example of a deflector.

The imaging lens 16 has a function to form an image of the reflected light or the scattered light from the detection range 110 of the image surface 100. In the embodiment, the focal length in the main scanning direction of the imaging lens 16 is equal to the focal length in the sub-scanning direction of the imaging lens 16.

The reflected light or the scattered light from the detection range 110 of the image surface 100, which passes through the imaging lens 16, enters the photo detector 17. The photo detector 17 has a function to detect, through the imaging lens 16, the reflected light or the scattered light of the light beam irradiated onto the detection range 110 of the image surface 100 (namely, the photo detector 17 has a function to detect an object). For example, an avalanche photodiode (APD) or a pin photodiode (PD) may be utilized as the photo detector 17. Here, the receiving optical system may be formed of only a lens and a photo detector, without introducing a rotating mirror.

In the embodiment, a second principal point is defined to be a point at which a principal plane of the imaging lens 16 and an optical axis of the imaging lens 16 meet at right angles. The photo detector 17 and the imaging lens 16 are disposed in the following manner. Namely, in the main scanning direction, the photo detector 17 and the imaging lens 16 are disposed such that a distance $L_2$ from a light receiving part of the photo detector 17 to the second principal point of the imaging lens 16 is equal to the focal length of the imaging lens 16. Namely, in the main scanning direction, the imaging lens 16 is disposed such that the second principal point is disposed at a position which is separated from the light receiving part of the photo detector 17 by a distance which is equal to the focal length of the imaging lens.

Additionally, in the sub-scanning direction, the photo detector 17 and the imaging lens 16 are disposed such that a distance $L_2$ from the light receiving part of the photo detector 17 to the second principal point of the imaging lens 16 is equal to the focal length of the imaging lens 16. Namely, in the sub-scanning direction, the imaging lens 16 is disposed such that the second principal point is disposed at a position which is separated from the light receiving part of the photo detector 17 by a distance which is equal to the focal length of the imaging lens 16.

In FIGS. 2A and 2B, $L_3$ indicates a minimum detectable distance, which is the smallest distance that can be detected by the object detector 10.

Hereinafter, the angular resolution is explained. In the object detector 10, for each of the main scanning direction and the sub-scanning direction, the angular resolution is defined, which is the minimum detectable angular range. That is because, in a detection range, in order to detect an object without missing a region or overlapping some regions regardless of the distance by which the object is separated from the object detector 10, it is more convenient to consider the resolution in terms of an angle, as shown in FIGS. 3A and 3B.

Figure 3A:
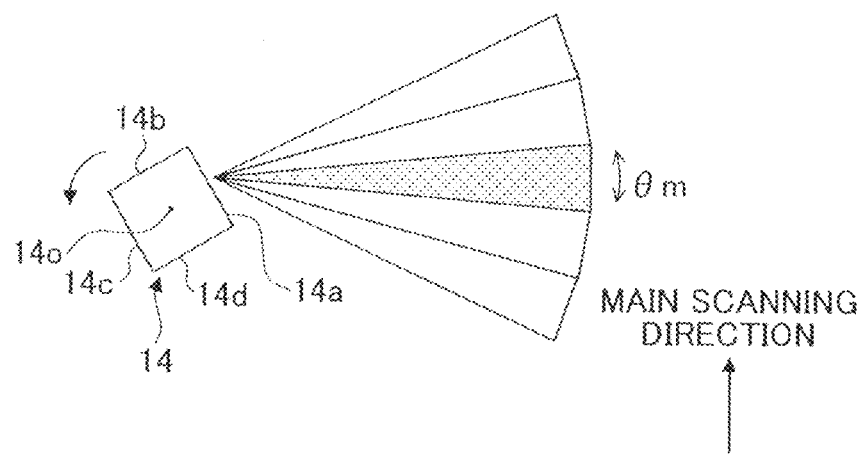
FIGS. 3A and 3B are diagrams illustrating angular resolution in a main scanning direction.
Figure 3B:
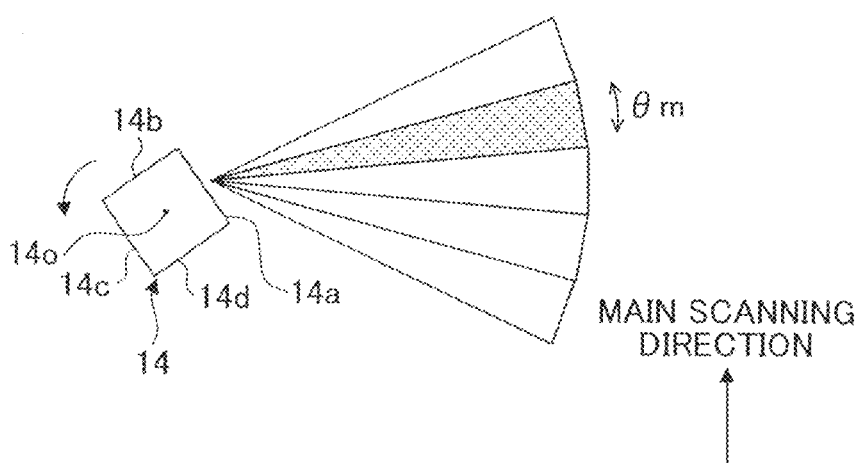

FIGS. 3A and 3B are schematic diagrams illustrating the angular resolution $\theta_m$ in the main scanning direction. As shown in FIG. 3A, at a particular moment, a region $\theta_m$ is detected. Subsequently, as shown in FIG. 3B, the rotating mirror 14 rotates by $\theta_m/2$. Accordingly, the scanning beam rotates by $\theta_m$, and the next region $\theta_m$ is detected. In this manner, for each of the regions $\theta_m$, the presence or absence of an object can be detected. When an object exists, a distance to the object can be detected.

Figure 4A:
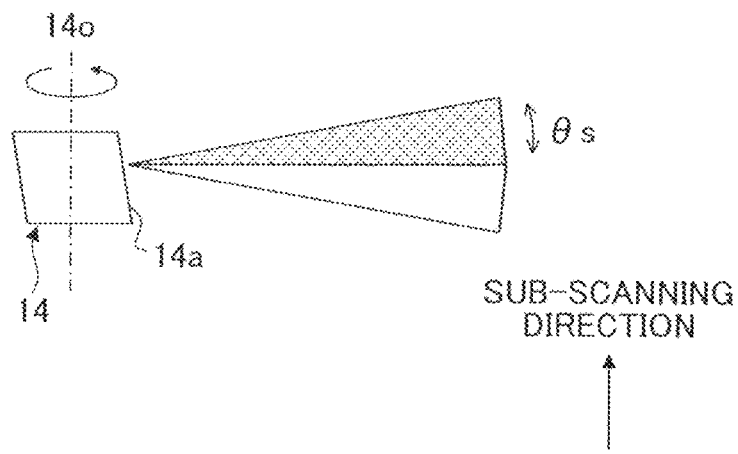
FIGS. 4A and 4B are diagrams illustrating angular resolution in a sub-scanning direction.
Figure 4B:
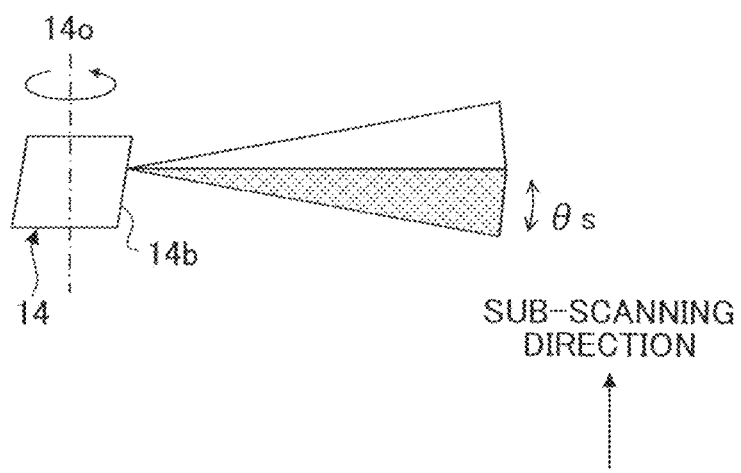

FIGS. 4A and 4B are schematic diagrams illustrating the angular resolution $\theta_s$ in the sub-scanning direction. As shown in FIGS. 4A and 4B, in the sub-scanning direction, by providing a difference in angle between the tilt angle of the reflector 14a of the rotating mirror 14 with respect to the rotational axis 14o and the tilt angle of the reflector 14b of the rotating mirror 14 with respect to the rotational axis 14o, different regions can be scanned. The angular resolution is defined in a region where an image of the light source 11 overlaps with a region detectable by the photo detector 17. However, the angular resolution can preferably be defined only in the image of the light source 11. In such a case, a degree of freedom of designing the receiving optical system can be increased, a certain quantity of light can be easily ensured, and missing a region in a detection range may be avoided.

Next, the size of the light emitting region is explained. The light source 11 (the semiconductor laser) includes a region which emits light (which is referred to as "light emitting region," hereinafter). The above-described light emitting point is any suitable point in the light emitting region. For example, the light emitting point may be a center point of the light emitting region.

Figure 5:
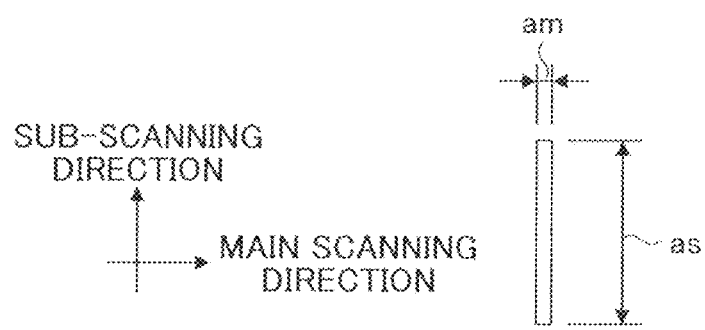
FIG. 5 is a diagram illustrating a size of a light emitting region.

In general, a light emitting region in a direction perpendicular to an active layer is different from a light emitting region in a direction parallel to the active layer. In the embodiment, the angular resolution $\theta_m$ in the main scanning direction is set to be higher (the angle is smaller) than the angular resolution $\theta_s$ in the sub-scanning direction ($\theta_m < \theta_s$). The light emitting region is arranged, such as shown in FIG. 5. In FIG. 5, a width of the light emitting region in the main scanning direction is defined to be a size "am" of the light emitting region in the main scanning direction. In FIG. 5, a width of the light emitting region in the sub-scanning direction is defined to be a size "as" of the light emitting region in the sub-scanning direction. When the width of the light emitting region in each of the main scanning direction and the sub-scanning direction varies, the size of the light emitting region in the corresponding direction can be defined to be the maximum width or the average width of the light emitting region in the corresponding direction.

In the example of FIG. 5, the size "am" of the light emitting region, which is the width of the light emitting region of the light source 11 in the main scanning direction, is different from the size "as" of the light emitting region, which is the width of the light emitting region of the light source 11 in the sub-scanning direction. The size "am" of the light emitting region is less than the size "as" of the light emitting region. The direction in which the size of the light emitting region is smaller coincides with the direction in which the angular resolution, which is the minimum detectable angular range, is higher (both in the main scanning direction).

In this manner, in the embodiment, the light source 11 is arranged, so that the size of the light emitting region in the main scanning direction (in which the angular resolution is high) becomes small. With such an arrangement, the structure of the coupling lens 12 can be simplified without increasing the loss of light quantity (e.g., a structure of a coaxial single lens). Hereinafter, it is explained in detail.

An example is considered, in which a coupling lens 12 is arranged, so that a light beam emitted from a single point on the light source 11 is converted into parallel light (so that a conjugate image on the light source 11 is formed at infinity). In this case, suppose that a size of a light emitting region is not negligible. Then, light which passes through the coupling lens 12 becomes divergent light, even if the coupling lens 12 is disposed, so that the light beam emitted from the single point on the light source 11 becomes parallel light. This is explained by referring to FIG. 6.

Figure 6:
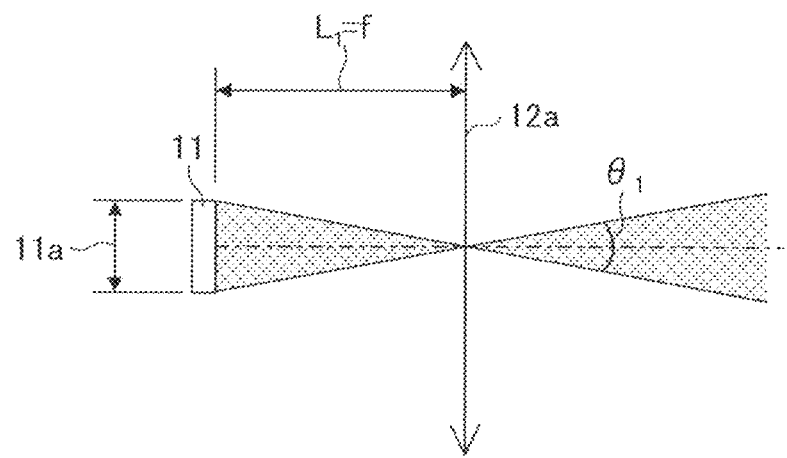
FIG. 6 is a diagram illustrating an irradiated region of a light source, when the light emitting region of the light source is considered.

FIG. 6 is a diagram exemplifying an irradiation region which is irradiated by a light source, when a light emitting region of the light source is considered. As shown in FIG. 6, a principal plane 12a of the coupling lens 12 is disposed at a position which is separated from a light emitting point of the light source 11 by the focal distance f of the coupling lens 12 so as to convert a light beam emitted from a single point on the light source 11 into parallel light.

Referring to FIG. 6, when a size of a light emitting region 11a of the light source 11 is denoted as "a," and only a near axis region is considered, a region in which an image of the light source 11 is formed can be expressed by $\theta_1 = 2 \times \tan^{-1}(a/2f)$. Namely, an angular range of $\theta_1$ is the irradiated region by the light emitting region 11a of the light source 11. In this manner, if the light emitting region 11a of the light source is not negligible, the light beam, which passes through the coupling lens 12, is broadened.

When the size "a" of the light emitting region 11a is small, the angular range $\theta_1$ of the irradiated region is small. Accordingly, a direction in which the angular resolution is high can be aligned with a direction in which the size "a" of the light emitting region is small so as to reduce the loss of light quantity.

Figure 7A:
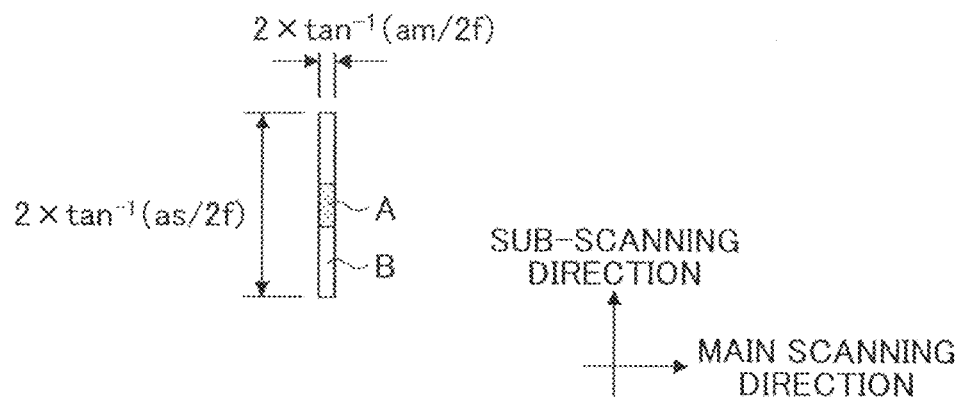
FIGS. 7A and 7B are diagrams illustrating an irradiated range based on the angular resolution and the light emitting region.
Figure 7B:
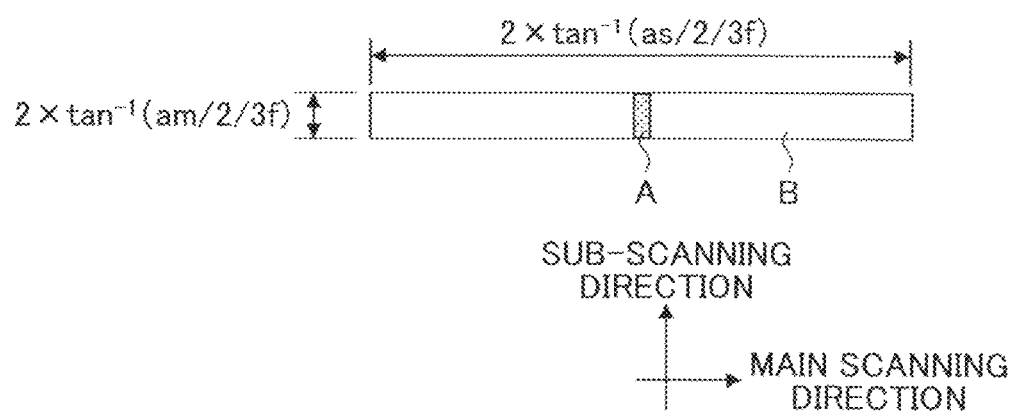

FIGS. 7A and 7B are diagrams illustrating the irradiated range based on the angular resolution and the light emitting region. FIG. 7A shows the irradiated range according to the embodiment. FIG. 7B shows the irradiated range according to a comparative example. In FIGS. 7A and 7B, the angular resolution is denoted by "A," and the irradiated range by the light emitting region is denoted by "B" ("B" indicates a range including a patterned portion and a non-patterned portion). Additionally, the size "am" of the light emitting region in the main scanning direction and the size "as" of the light emitting region in the sub-scanning direction are as shown in FIG. 5.

As exemplified in FIG. 7A, the light source 11 is arranged and the focal length of the coupling lens 12 is set, so that the angular resolution in the main scanning direction becomes high, and the size of the light emitting region in the main scanning direction becomes small. When the coupling lens 12 includes only a single lens, a ratio between the size of the light emitting region in the main scanning direction and the size of the light emitting region in the sub-scanning direction is directly reflected in the irradiated range. Here, a unit of the irradiated range is an angle, as is clear from the above-described formula.

It is desirable that the entire region of the angular resolution is irradiated by an image of the light source 11. Since the angular resolution "A" coincides with the irradiated range "B," in the main scanning direction, the state shown in FIG. 7A may be the most efficient state. In FIG. 7A, the angular resolution in the sub-scanning direction is not achieved (in the sub-scanning direction, the irradiated range "B" is greater than the angular resolution "A"). However, the angular resolution in the sub-scanning direction can be achieved, for example, by defining the image of the photo detector 17, so that the image of the light source 11 is superposed with the image of the photo detector 17.

Next, suppose that the light source 11 is arranged, so that, as exemplified in the comparative example of FIG. 7B, the size of the light emitting region becomes large in the main scanning direction, in which the angular resolution "A" is high. In the comparative example shown in FIG. 7B, the entire angular range corresponding to an amount of the angular resolution in the sub-scanning direction may not be irradiated, unless the focal length of the coupling lens 12 is set to be 3f, which is three times as much as "f" shown in FIG. 7A (in the comparative example, the angular resolution in the main scanning direction is achieved by an image of the photo detector 17). In such an arrangement, a ratio of the range of the angular resolution to the irradiated range becomes small, and the loss of light quantity increases.

Next, as an example, a case is considered in which a length in a longitudinal direction of the light emitting region is 200 μm, and a length in a short length direction is 10 μm. The angular resolution in the main scanning direction is defined to be 0.1 degree, and the angular resolution in the sub-scanning direction is defined to be 1 degree. The light emitting region in the short length direction is aligned with the main scanning direction. In order to coincide the angular resolution in the main scanning direction and the irradiated range by the light emitting region in the short length direction, the focal length of the coupling lens 12 may be adjusted to be 5.7 mm. However, this focal length is relatively small, and it may not be achieved easily due to mechanical interference with the light source 11. Additionally, an irradiated position is highly sensitive with respect to variation of the disposed position of the coupling lens 12. The irradiated position may be shifted easily by the variation of the disposed position of the coupling lens 12. Thus, it may be difficult to adjust the position of the coupling lens 12, or a shift of the irradiated position may be increased depending on elapsed time.

Accordingly, in the embodiment, for example, a coupling lens 12 having a focal length of 13 mm (which is greater than 5.7 mm) is utilized. When the coupling lens 12 is arranged, so that the distance from its principal point to the light emitting point is equal to the focal length, in theory, by substituting the numerical values in the above-described formula, it is obtained that the irradiated range in the main scanning direction can be 0.04 degrees. In reality, the irradiated range in the main scanning direction can be 0.08 degrees, due to an effect of an aberration, for example. However, in this case, the irradiated range in the main scanning direction is less than 0.1 degree, which is the angular resolution in the main scanning direction. Thus, some portions of the irradiated range may be missed.

To address this problem, the light beam, which passes through the coupling lens 12, can be converted into diverging light in the main scanning direction, in which the size of the light emitting region is small, by shortening the distance from the light emitting point of the light source 11 to the coupling lens 12 (which is 13 mm) by 20 μm, for example. In this manner, the irradiated range in the main scanning direction can be adjusted to be 0.1 degree.

At this time, since the size of the light emitting region is large, in the irradiated range in the sub-scanning direction, an effect of the size of the light emitting region is a major factor that affects a degree of divergence of the light beam, which passes through the coupling lens 12. Accordingly, the irradiated range of 1.0 degree can be maintained, even if the distance from the light emitting point of the light source 11 to the coupling lens 12 is shortened by 20 μm. As described above, according to the theory, the irradiated range in the sub-scanning direction may be 0.9 degrees. However, due to an effect of an aberration, for example, the irradiated range of 1.0 degree can be achieved.

Figure 8A:
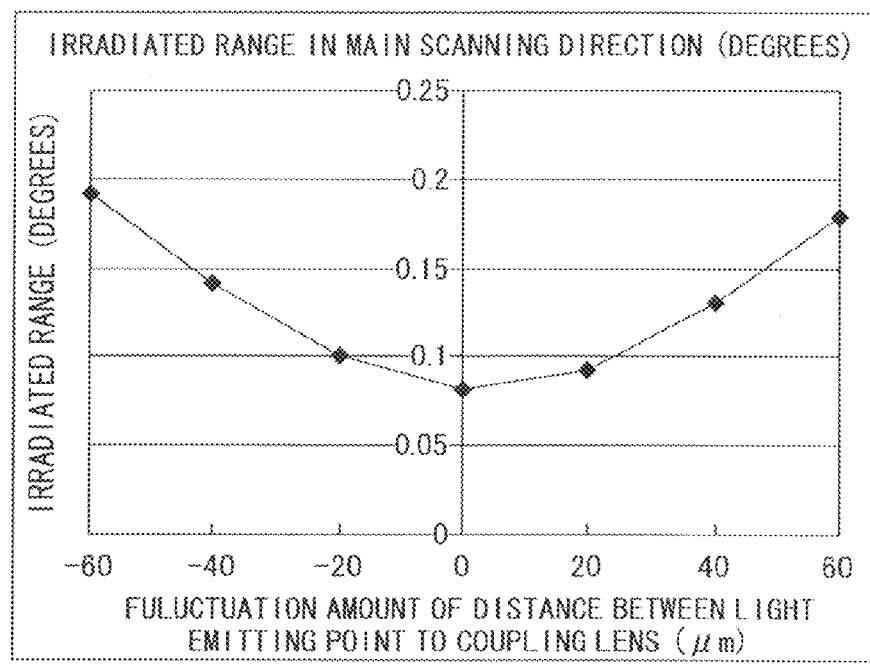
FIGS. 8A and 8B are diagrams (version 1) exemplifying variations of an irradiated range with respect to a fluctuation amount of a distance from a light emitting point of the light source to a coupling lens.
Figure 8B:
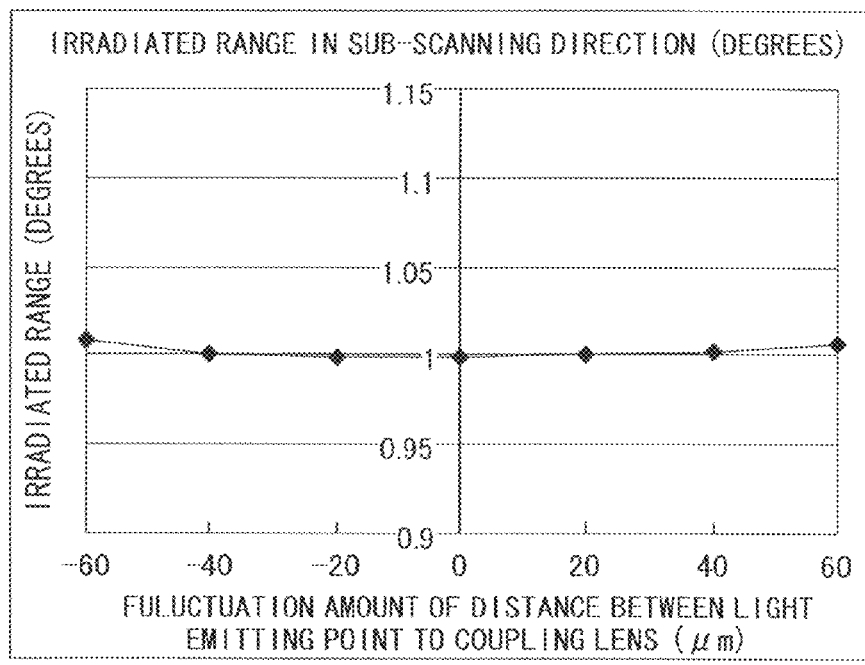

FIGS. 8A and 8B are diagrams exemplifying variations of the irradiated range with respect to a fluctuation amount of the distance from the light emitting point of the light source 11 to the coupling lens 12. FIG. 8A shows the variation of the irradiated range in the main scanning direction. FIG. 8B shows the variation of the irradiated range in the sub-scanning direction.

In FIGS. 8A and 8B, the case in which the fluctuation amount of the distance from the light emitting point to the coupling lens 12 is zero corresponds to the case in which the distance from the light emitting point to the principal point of the coupling lens 12 is equal to the focal length of the coupling lens 12. It can be found that, in this case, the light is almost parallel light (which implies that the irradiated range is small, namely, the degree of divergence is small).

The ranges of the vertical axis and the horizontal axis of FIG. 8A are adjusted to be equal to the ranges of the vertical axis and the horizontal axis of FIG. 8B, respectively. In the sub-scanning direction, in which the size of the light emitting region is large, the variation in the degree of divergence is small when the distance from the light emitting point to the coupling lens 12 is varied. Namely, when the size of the light emitting region is large, the degree of divergence of the light beam, which passes through the coupling lens 12, is less sensitive with respect to the distance from the light emitting point to the coupling lens 12.

A plurality of light emitting layers may be laminated. By laminating a plurality of light emitting layers, a light emitting quantity of the light source 11 can be increased. In such a case, an object which is separated by a farther distance can be detected. Moreover, the detection can be made which is less affected by a weather condition.

Figure 9A:
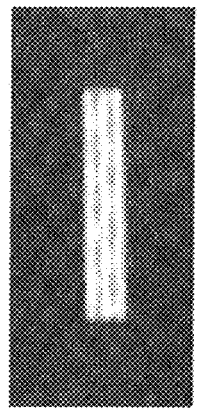
FIGS. 9A and 9B are diagrams exemplifying a change in an image of the light source depending on a position of the coupling lens.
Figure 9B:
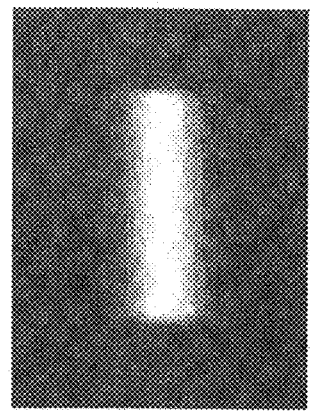

FIGS. 9A and 9B are diagrams exemplifying variations of an image of the light source 11 with respect to the position of the coupling lens 12. FIG. 9A shows an image of the light source 11, when the light source 11 is utilized in which the plurality of light emitting layers is laminated, and when the distance from the light source 11 to the coupling lens 12 is equal to the focal length of the coupling lens 12. In FIG. 9A, the white area is an area where the light intensity is high. As the area become darker, the light intensity becomes lower.

At this time, a conjugate image of the light emitting region appears in a distant region. An image of the light emitting region appears almost normal. In FIG. 9A, three light emitting layers are laminated, and an image of the three light emitting layers can be observed. Since a gap between the light emitting layers does not emit light, the light quantity may be insufficient in the corresponding region on a target, and some regions of the detection area may be missed.

In many cases, the light emitting layers are laminated in a direction (which is the horizontal direction in FIG. 9A) perpendicular to a direction (which is the vertical direction in FIG. 9A) in which an active layer is extended. Namely, in the light emitting region of the light source 11, the plurality of light emitting layers is laminated in the direction in which the size of the light emitting region is small.

As described above, when the degree of divergence of the light beam is increased in the direction in which the size of the light emitting region is small, so as to achieve the angular resolution, a detection area corresponding to the gap, which does not emit light, may not be missed. In this case, the light beam can be irradiated without missing some detection areas. Namely, when the distance between the light emitting point of the light source 11 to the coupling lens 12 is less then the focal length of the coupling lens 12, the light beam can be irradiated without missing the detection area corresponding to the gap, which does not emit light.

FIG. 9B shows an image of the light source 11 in a distant region, when the light source 11 is utilized in which the plurality of light emitting layers is laminated, and when the distance from the light source 11 to the principal point of the coupling lens 12 is less than the focal length of the coupling lens 12. In FIG. 9B, the degree of divergence of the light beam is greater, compared to that of FIG. 9A. It can be observed in FIG. 9B that, in the whole irradiated range, the light quantity is sufficient. For the case of FIG. 9B, in the light emitting region of the light source 11, three light emitting layers are also laminated in the direction in which the size of the light emitting region is small. Unlike the case of FIG. 9A, the light quantity is sufficient in the whole region.

In this manner, a light beam to be irradiated onto an object is generated by converting a light beam from the light source 11 (e.g., a semiconductor laser) into a predetermined state by the coupling lens 12. At this time, an angular range to be irradiated is determined by the size of the light emitting region of the light source 11 and the focal length of the coupling lens 12. The smaller the size of the light emitting region is, the smaller the angular range to be irradiated becomes.

In the embodiment, a structure of the coupling lens 12 can be simplified (e.g., a structure of a coaxial single lens), without increasing the loss of light quantity, by coinciding the direction in which the size of the light emitting region is small and the direction in which the angular resolution is large (i.e., the direction in which the minimum detectable angular range is smaller).

In the direction in which the size of the light emitting region is small, the light source 11 may be assumed to be substantially a point light source. Thus, a light beam from the light emitting point (diverging light) can be converted substantially into parallel light, by arranging the coupling lens 12, so that the distance from the light emitting point to the principal point of the coupling lens 12 is equal to the focal length of the coupling lens 12. However, in order to make detection without missing any region in a detection area, the light beam which passes through the coupling lens 12 may have a diverging angle, instead of being parallel light. In the embodiment, the detection area can be detected without missing any region by changing the condensed state of the light beam by the coupling lens 12 from the parallel state (i.e., the light beam is converted into slightly diverging light).

In the direction in which the size of the light emitting region is large, the light source 11 may not be assumed to be a point light source. Accordingly, the light beam from the light emitting point may not be converted into parallel light, even if the coupling lens 12 is arranged, so that the distance from the light emitting point to the principal point of the coupling lens 12 is equal to the focal length of the coupling lens 12. In order to achieve the angular resolution in this direction, the focal length of the coupling lens can be adjusted. In the direction in which the size of the light emitting region is large, due to the effect of the size of the light emitting region, the degree of divergence of the light beam may not vary significantly, even if the distance from the light emitting point to the principal point of the coupling lens 12 is slightly shifted from the focal length of the coupling lens 12.

Accordingly, as described above, the degree of divergence of the light beam in the direction in which the size of the light emitting region is large can be maintained, even if the condensed state of the light beam by the coupling lens 12 is changed from the state of the parallel light. Namely, in the embodiment, the degree of divergence of the light beam in the direction in which the size of the light emitting region is large can be maintained, while achieving the angular resolution in the direction in which the size of the light emitting region is small, by changing the condensed state of the light beam by the coupling lens 12 from the state of the parallel light (i.e., by converting the light beam into the slightly diverging light beam).

Further, by laminating a plurality of light emitting layers in the light emitting region, the light emitting quantity of the light source 11 can be increased. In this case, an object which is separated by a farther distance can be detected, and the detection can be made which is less affected by a weather condition. Additionally, by converting the light beam into the diverging light in the direction in which the size of the light emitting region is small, the light beam can be irradiated onto the detection area without missing a region corresponding to the gap between the layers, which does not emit light.

Another Example

Hereinafter, another example is explained. In this example, the optical system is modified, which converts the light beam emitted from the light source into a predetermined state (i.e., an example of the optical system including a plurality of lenses). In the following explanation, an explanation of a portion of a configuration which is the same as the corresponding portion of the above-described configuration is omitted.

Figure 10A:
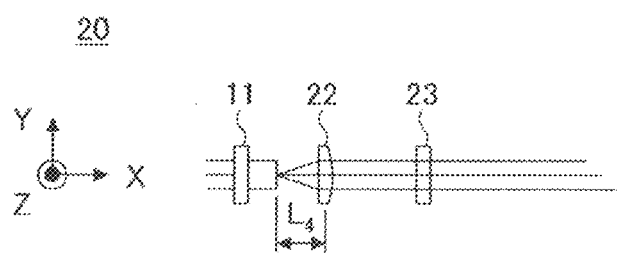
FIGS. 10A and 10B are schematic diagrams partially exemplifying the projection optical system of the object detector according to a modified example.
Figure 10B:
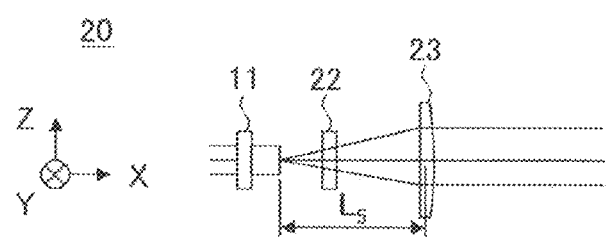

FIGS. 10A and 10B are schematic diagrams partially exemplifying the projection optical system of an object detector 20 according to the example. FIG. 10A shows a cross-section in a direction parallel to the XY plane. FIG. 10B shows a cross-section in a direction parallel to the XZ plane.

As shown in FIGS. 10A and 10B, the object detector 20 is different from the object detector 10 (cf. FIGS. 1A, 1B, 2A and 2B) in a point whereas the coupling lens 12 is replaced by coupling lenses 22 and 23. The coupling lenses 22 and 23 are cylindrical lenses.

The coupling lens 22 has optical power only in the XY plane. The coupling lens 22 is disposed at a position close to the light source 11 (downstream of the light source 11). The coupling lens 23 has optical power only in the ZX plane. The coupling lens 23 is disposed at a position separated from the light source 11 (downstream of the coupling lens 22).

With the configuration of FIGS. 10A and 10B, a diverging angle of the light beam emitted from the light source 11 and passing through the coupling lens 22 differs depending on a direction. Accordingly, the shape of the coupling lens 23 is different depending on the direction. Further, if the coupling lenses 22 and 23 were rotated around an axis corresponding to the traveling direction of the light beam, the coupling lenses 22 and 23 would have optical power in an undesired direction. Accordingly, the external shapes of the coupling lenses 22 and 23 can be rectangular shapes so as to prevent the coupling lenses 22 and 23 from being rotated.

As described in detail later, a distance $L_4$ from the light emitting point to the principal point of the coupling lens 22 may be equal to a focal length of the coupling lens 22. Similarly, a distance $L_5$ from the light emitting point to the principal point of the coupling lens 23 may be equal to a focal length of the coupling lens 23.

In the example, the coupling lens 22 and the coupling lens 23 are utilized. The coupling lens 22 has optical power only in the main scanning direction. The coupling lens 23 has optical power only in the sub-scanning direction. Thus, the angular resolution in the main scanning direction and the angular resolution in the sub-scanning direction can be independently set. Therefore, a degree of freedom in design can be increased.

Additionally, it is possible to independently set the distance from the light emitting point to the principal point of the coupling lens 22 to be the focal length of the coupling lens 22 in the main scanning direction, and the distance from the light emitting point to the principal point of the coupling lens 23 to be the focal length of the coupling lens 23 in the sub-scanning direction. Accordingly, a degree of freedom on shaping the optical beam in the main scanning direction and the sub-scanning direction can be increased. Therefore, the angular resolution in the main scanning direction and the angular resolution in the sub-scanning direction can be achieved with high precision.

Further Example

Hereinafter, a further example is explained. In this example, the optical system is modified, which converts the light beam emitted from the light source into a predetermined state. In the following explanation, an explanation of a portion of a configuration which is the same as the corresponding portion of any one of the above-described configurations is omitted.

Figure 11A:
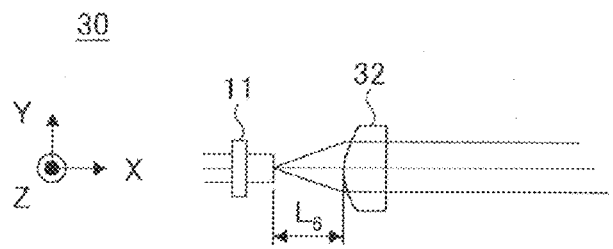
FIGS. 11A and 11B are schematic diagrams partially exemplifying the projection optical system of the object detector according to another modified example.
Figure 11B:
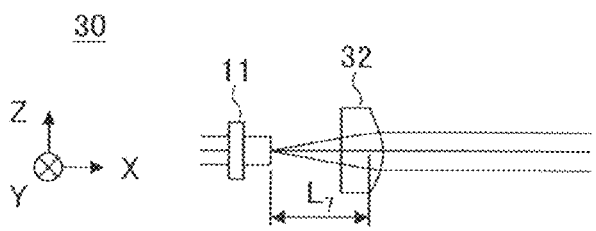

FIGS. 11A and 11B are schematic diagrams partially exemplifying the projection optical system of an object detector 30 according to the example. FIG. 11A shows a cross-section in a direction parallel to the XY plane. FIG. 11B shows a cross-section in a direction parallel to the XZ plane.

As shown in FIG. 11, in the object detector 30, the optical system, which converts the light beam emitted from the light source 11 into the predetermined state, includes a single coupling lens 32 which has optical power such that optical power in the main scanning direction is different from the optical power in the sub-scanning direction. The coupling lens 32 is a single coupling lens such that one of an entrance surface and an exit surface has optical power in the main scanning direction, while the other one of the entrance surface and exit surface has optical power in the sub-scanning direction.

By forming the optical system which converts the light beam emitted from the light source 11 into the predetermined state with the single coupling lens 32, the number of components and the cost can be reduced. In addition, by forming the optical system with the single coupling lens 32, the angular resolution in the main scanning direction and in the sub-scanning direction can be achieved with a higher precision, compared to a case in which the optical system is formed of a coupling lens having a rotationally symmetric shape.

In this example, the coupling lens 32 is exemplified, whose optical power on the entrance surface is different from that of the exit surface. However, a single surface of a coupling lens may have optical power such that the optical power in the main scanning direction is different from the optical power in the sub-scanning direction. For example, a coupling lens may be utilized in which only the exit surface has optical power such that the optical power in the main scanning direction is different from the optical power in the sub-scanning direction.

In this case, it is difficult to set the distance from the light emitting point to the principal point of the coupling lens to be equal to the focal length of the coupling lens both in the main scanning direction and in the sub-scanning direction. However, the configuration has an advantage such that it is easy to correct aberrations both in the main scanning direction and in the sub-scanning direction. Additionally, the configuration has an advantage such that variation of an optical characteristic, such as variation in surface accuracy, is small.

As another example of the coupling lens, a configuration may be considered such that, on the entrance surface, concave optical power is added to one of the main scanning direction and the sub-scanning direction, and on the exit surface, optical power is added such that the light beam is converted into a desired diverging state after passing through the coupling lens. In this case, the focal length may be set to be a position outside the coupling lens. Accordingly, there is an advantage such that the focal length may be dynamically adjusted.

As described above, a surface shape of a coupling lens may be modified in various ways, depending on a desired optical characteristic. For the case in which two coupling lenses are utilized as described above, surface shapes of the corresponding lenses may be modified in various ways. In this manner, a configuration may be selected, which is more suitable for the optical characteristic to be achieved by the various modifications.

At this time, the optical system may be arranged, so that the distance from the light emitting point of the light source 11 to the principal point of the optical system (which converts the light beam emitted from the light source 11 into a predetermined state) in the direction in which the size of the light emitting region is large is equal to the focal length of the optical system in that direction.

Figure 12:
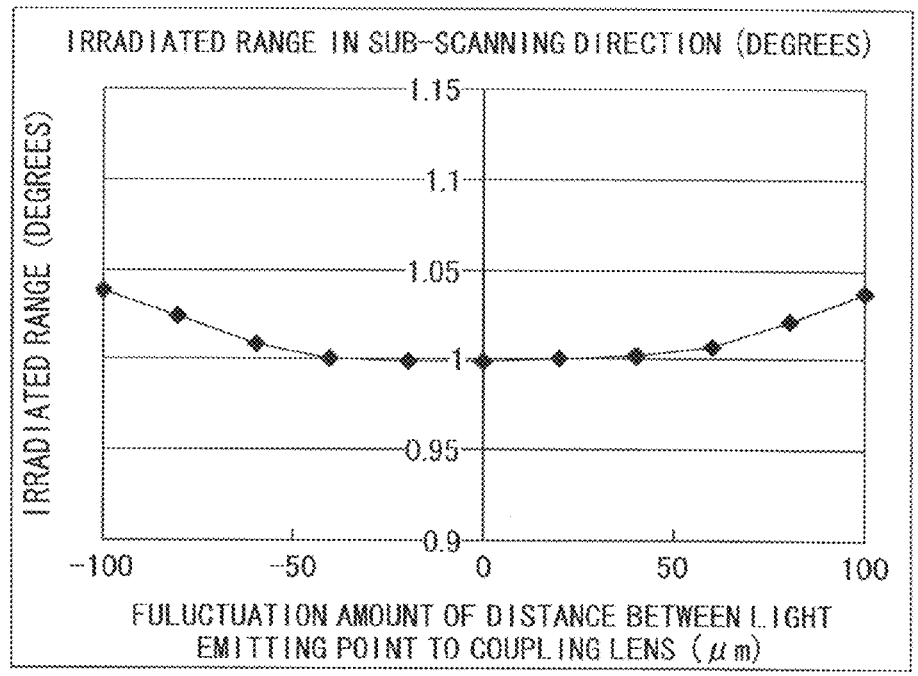
FIG. 12 is a diagram (version 2) exemplifying variation of the irradiated range with respect to the fluctuation amount of the distance from the light emitting point of the light source to the coupling lens.

FIG. 12 is a diagram exemplifying variation in the irradiated range with respect to the fluctuation amount of the distance from the light emitting point of the light source 11 to the coupling lens. In FIG. 12, it can be found that, in the vicinity of the point at which the fluctuation amount of the distance from the light emitting point to the coupling lens is zero, variation of the irradiated range is small, even if the distance from the light emitting point to the principal point of the coupling lens is varied.

Namely, with the above-described configuration, even if there are variations (especially, in the direction of the optical axis) in the positions at which the coupling lens and the like are arranged, variation in the angular range of the irradiated light beam can be regulated to be small, and the angular resolution can be stably maintained.

Hereinabove, the object detector that can reduce the loss of light quantity is explained by the embodiment. However, the present invention is not limited to the specifically disclosed embodiment, and variations and modification may be made without departing from the scope of the present invention.

For example, an object detector for which the angular resolution in the sub-scanning direction is higher than the angular resolution in the main scanning direction, an object detector in which the shape of the light emitting region is not a rectangular shape, and an object detector for which the direction in which the light emitting layers are laminated is different from that of the above-described embodiment may be included in the scope of the present invention.

The present application is based on and claims the benefit of priority of Japanese Priority Application No. 2013-015941 filed on Jan. 30, 2013, the entire contents of which are hereby incorporated herein by reference.

What is claimed is:

1. An object detector comprising:
 a light source;
 an optical system configured to convert a light beam emitted from the light source into a predetermined state;
 a deflector configured to deflect and scan the light beam passing through the optical system, and configured to irradiate the light beam onto an object; and
 a photo detector configured to detect, from the object, reflected light or scattered light of the light beam irradiated onto the object,
 wherein a first size of a light emitting region of the light source is different from a second size of the light emitting region, wherein the first size is a first width of the light emitting region in a first direction, and the second size is a second width of the light emitting region in a second direction, and
 wherein the light source is arranged such that one of the first direction and the second direction corresponding to a smaller one of the first size and the second size coincides with a direction in which angular resolution is higher, wherein the angular resolution is a minimum detectable angular range.

2. The object detector according to claim 1,
 wherein the optical system is configured to convert the light beam emitted from the light source into a diverging state in the one of the first direction and the second direction.

3. The object detector according to claim 1,
 wherein a plurality of layers is laminated in the light emitting region of the light source in the one of the first direction and the second direction corresponding to the smaller one of the first size and the second size.

4. The object detector according to claim 1,
 wherein the optical system includes a plurality of lenses.

5. The object detector according to claim 1,
 wherein the optical system includes a single lens having optical power such that the optical power in the first direction is different from the optical power in the second direction.

6. The object detector according to claim 1,
 wherein a distance from a light emitting point of the light source to a principal point of the optical system in the other one of the first direction and the second direction is equal to a focal length of the optical system.

7. The object detector according to claim 1,
 wherein the first direction is a direction in which the deflector deflects and scans the light beam, and the second direction is a direction perpendicular to the direction in which the deflector deflects and scans the light beam.

8. The object detector according to claim 1,
 wherein the first direction corresponds to a main scanning direction, and the second direction corresponds to a sub-scanning direction.

* * * * *